United States Patent
Nada et al.

(10) Patent No.: US 9,412,486 B2
(45) Date of Patent: Aug. 9, 2016

(54) COMPOSITE OXIDE POWDER FOR SOLID OXIDE FUEL CELL AND ITS PRODUCTION METHOD

(71) Applicant: AGC SEIMI CHEMICAL CO., LTD., Chigasaki-shi (JP)

(72) Inventors: Futoshi Nada, Chigasaki (JP); Takene Hirai, Chigasaki (JP)

(73) Assignee: AGC SEIMI CHEMICAL CO., LTD., Chigasaki-shi (JP)

( * ) Notice: Subject to any disclaimer, the term of this patent is extended or adjusted under 35 U.S.C. 154(b) by 171 days.

(21) Appl. No.: 14/337,709

(22) Filed: Jul. 22, 2014

(65) Prior Publication Data
US 2015/0053898 A1    Feb. 26, 2015

(30) Foreign Application Priority Data
Aug. 23, 2013  (JP) .................. 2013-173633

(51) Int. Cl.
| | | |
|---|---|---|
| *H01B 1/08* | (2006.01) | |
| *C01G 45/02* | (2006.01) | |
| *C01F 17/00* | (2006.01) | |
| *H01M 8/12* | (2016.01) | |
| *C01G 45/12* | (2006.01) | |

(52) U.S. Cl.
CPC ............ *H01B 1/08* (2013.01); *C01F 17/0018* (2013.01); *C01G 45/02* (2013.01); *C01G 45/1264* (2013.01); *H01M 8/1246* (2013.01); *C01P 2002/34* (2013.01); *C01P 2002/72* (2013.01); *C01P 2002/85* (2013.01); *C01P 2004/03* (2013.01); *C01P 2004/51* (2013.01); *C01P 2004/61* (2013.01); *H01M 2300/0074* (2013.01); *Y02E 60/521* (2013.01); *Y02E 60/525* (2013.01); *Y02P 70/56* (2015.11)

(58) Field of Classification Search
CPC ............ H01B 1/00; H01B 1/08; C01G 45/00; C01G 45/02
See application file for complete search history.

(56) References Cited

FOREIGN PATENT DOCUMENTS

| | | |
|---|---|---|
| JP | 2006-1813 | 1/2006 |
| JP | 2009-35447 | 2/2009 |
| JP | 2012-138256 | 7/2012 |
| WO | 2008/018634 A1 * | 2/2008 |

OTHER PUBLICATIONS

Wang et al "Synthesis of Different-Sized La0.7Sr0.3MnO3 Nanoparticles . . . ", J. Supercond. Nov. Magn. (2013) 26:3462-3467.*

Wu et al "Preparation of La0.75Sr0.25Cr0.5Mn0.5O3-gamma Nanometer Powders . . .", Advanced Materials Research, vols. 712-715, pp. 257-261 (2013) (Abstract).*

(Continued)

*Primary Examiner* — Mark Kopec
(74) *Attorney, Agent, or Firm* — Oblon, McClelland, Maier & Neustadt, L.L.P.

(57) ABSTRACT

To provide a composite oxide powder for a solid oxide fuel cell containing lanthanum, strontium and/or calcium, manganese and oxygen and having a highly uniform composition, and its production method. A composite oxide powder containing lanthanum, strontium and/or calcium, manganese and oxygen, wherein the coefficient of variation ($\alpha$) of lanthanum is at most 6.0% and the coefficient of variation ($\beta$) of manganese is at most 13.0%, as calculated from the peak area ratio of the L$\alpha$ ray of lanthanum and the K$\alpha$ ray of manganese measured by an energy dispersive X-ray spectrometer attached to a scanning electron microscope.

11 Claims, 3 Drawing Sheets

(56) References Cited

OTHER PUBLICATIONS

Lin et al "Synthesis and Investigation of submicrometer spherical indium oxide partciles", J. Am. Ceram. Soc. 91(4), 1121-1128 (2008).*

Teraoka et al "Hydroxy acid-aided synthesis of perovskite-type oxides . . . ", Chem. Lett. pp. 673-676 (1991).*

Shoji Otoshi, et al., "Changes in the Phases and Electrical Conduction Properties of $?(?La_{1?-?x}Sr_x?)?_{1?-?y}MnO_{3?-?\delta}$", Journal of The Electrochemical Society, vol. 138, Issue 5, 1991, 6 pages.

* cited by examiner

COMPOSITE OXIDE POWDER FOR SOLID OXIDE FUEL CELL AND ITS PRODUCTION METHOD

FIELD OF INVENTION

The present invention relates to a composite oxide powder for a solid oxide fuel cell, comprising a composite oxide containing lanthanum, strontium and/or calcium, manganese and oxygen, and its production method. More particularly, it relates to a composite oxide powder for a solid oxide fuel cell having a high uniformity of the composition of constituting elements in particles of the composite oxide, and its production method.

BACKGROUND OF INVENTION

A solid oxide fuel cell is a fuel cell employing as an electrolyte a solid electrolyte having oxygen ion conductivity, and attracts attention as a clean energy since the electrochemical reaction which causes electromotive force is a hydrogen oxidation reaction, and no carbon dioxide gas is formed. A solid oxide fuel cell usually has a stack structure comprising single cells each comprising an air electrode as an oxide, a solid electrolyte and a fuel electrode connected by an interconnector. Its operating temperature is usually about 1,000° C., and decrease in the temperature is attempted and practically employed by various studies, however, it is at least about 600° C. and is still high temperature.

An air electrode material constituting the air electrode of a solid oxide fuel cell, is basically required to have such properties that (1) it has a high oxygen ion conductivity, (2) it has a high electron conductivity, (3) its thermal expansion is similar to or about the same as that of an electrolyte, (4) it has high chemical stability and has high compatibility with other constituting materials, and (5) the sintered product is required to be a porous product and it has a certain strength, etc.

Patent Document 1 proposes as an air electrode material constituting an air electrode, a ceramic powder containing as the main component a lanthanum ferrite perovskite oxide represented by the compositional formula $(L_{1-x}AE_x)_{1-y}(Fe_zM_{1-z})O_{3+\delta}$, wherein L is one or more of elements selected from the group consisting of Sc, Y and rare earth elements, AE is one or two of elements selected from the group consisting of Ca and Sr, M is one or more of elements selected from the group consisting of Mg, Sc, Ti, V, Cr, Co and Ni, $0<x<0.5$, $0<y\leq0.04$ and $0\leq z<1$.

Patent Document 1 discloses in Example 2 $(La_{0.6}Sr_{0.4})_{1-z}(Co_{0.2}Fe_{0.8})O_{3+\delta}$ (y=0.02, 0.04) prepared by a citrate method. The $(La_{0.6}Sr_{0.4})_{1-z}(Co_{0.2}Fe_{0.8})O_{3+\delta}$ is a sample prepared by the same method as in Comparative Example 1 in this specification, and is inferior in the homogeneity of the constituting elements.

Further, Patent Document 2 proposes a lanthanum ferrite perovskite oxide of $(La_{1-x}Sr_x)_aCo_yFe_{1-y}O_3$ (I)($0.2\leq x\leq0.5$, $0.1\leq y\leq0.6$, $0.9\leq a\leq1.0$), and a method for producing the lanthanum ferrite perovskite oxide using citric acid and an ammonia compound such as ammonium bicarbonate or ammonium carbonate.

The present inventors have tried to prepare $(La_{1-x}Sr_x)_aMnO_{3+\delta}$ composite oxide powder having a perovskite structure by using citric acid and an ammonia compound such as ammonium bicarbonate or ammonium carbonate as disclosed in Patent Document 2, however, found industrial application of the production method difficult due to a high cost since an expensive apparatus to detoxify harmful ammonia gas and/or nitrogen oxide gas which forms at the time of firing is necessary.

Further, as a material which satisfies properties of an air electrode, a composite oxide (sometimes referred to as LSM) represented by $(La_{1-x}A_x)_{1-a}MnO_{3+\delta}$ (wherein A is strontium and/or calcium) having a perovskite structure is energetically studied and developed as an air electrode material excellent in the electrode activity.

For example, Non-Patent Document 1 discloses that $(La_{1-x}Sr_x)_{0.94}MnO_{3-\delta}$ ($0.08\leq x\leq0.21$) which is A site deficient LSM undergoes phase transition together with oxygen release at about 1,000° C. in the air. In this Non-Patent Document 1, a sample used for heat analysis and electrical conductivity measurement is prepared by a typical solid phase method of mixing material powders which are carbonates by a mixing and pulverizing machine, firing the mixture at 1273K for 15 hours, pulverizing the fired product and further firing the pulverized product at high temperature of 1573K for 48 hours. However, by such a solid phase method, lanthanum, strontium and manganese as elements constituting LSM are hardly homogeneously dispersed in particles even by firing at a temperature so high as 1573K (1,300° C.).

Further, Patent Document 3 discloses in paragraph [0024] as a method for preparing $La_{0.8}Sr_{0.2}MnO_{3+\delta}$ a method of adding a mixture of nitrates as starting materials in ethanol in which oxalic acid is dissolved to coprecipitate an oxalate, followed by calcination. Since in this coprecipitation method precipitates are formed from a uniform solution, it is apparently considered that one having a uniform composition is easily formed, however, according to studies by the present inventors, it was found that in practice, the precipitates do not have a uniform composition since the pH at which insoluble salts of the respective elements precipitate and their crystal growth rates are different among the nitrates of the three types of elements. For example, a salt of one element is precipitated first and grows into large particles, and then micro crystals of the next element are precipitated on the large particles, and accordingly it is difficult in principle to obtain precipitates having a sufficiently uniform composition.

PRIOR ART DOCUMENTS

Patent Documents

Patent Document 1: JP-A-2009-035447
Patent Document 2: JP-A-2012-138256
Patent Document 3: JP-A-2006-001813

Non-Patent Documents

Non-Patent Document 1: J. Electrochem. Soc., Vol. 138, 5, 1519-1523 (1991).

SUMMARY OF INVENTION

Technical Problem

It is an object of the present invention to provide a novel composite oxide powder for a solid oxide fuel cell having a uniform composition suitable as an air electrode material for a solid oxide fuel cell, and a production method to obtain such a composite oxide powder for a solid oxide fuel cell having a uniform composition.

Solution to Problem

The present inventors have found that in conventional LSM fine particles prepared by a solid phase method, a coprecipitation method or the like, the three component elements hardly have a uniform composition in principle. They have conducted extensive studies from such a viewpoint and as a result, found that LSM fine particles having a uniform composition even at the micro level can be obtained by using an aqueous solution of a mixture of citric acid with an organic acid such as malic acid, reacting raw material compounds containing La, Sr and/or Ca and Mn with the organic acid in the solution to form a complex compound and forming the complex compound into a solution or a slurry, and drying and firing the solution or the slurry, and accomplished the present invention.

That is, the present invention provides the following.

[1] A composite oxide powder for a solid oxide fuel cell containing lanthanum, strontium and/or calcium, manganese and oxygen, wherein when the lanthanum content ($w_a$ (wt %)) and the manganese content ($w_b$ (wt %)) calculated from the peak area ratio of the Lα ray of lanthanum and the Kα ray of manganese in each of 12 lattice points divided into a lattice form each 8 μm on a side, as portions to be analyzed, in a scanning electron microscope (SEM) image of the composite oxide powder measured by an energy dispersive X-ray spectrometer (EDX) attached to the scanning electron microscope, satisfy the relation of the following formula (1), the coefficient of variation (α) of the lanthanum content in the 12 lattice points is at most 6.0%, and the coefficient of variation (β) of the manganese content in the 12 lattice points is at most 13.0%:

$$w_a + w_b = 100 \text{ (wt\%)}$$

[2] The composite oxide powder for a solid oxide fuel cell according to the above [1], wherein the coefficient of variation (α) of the lanthanum content is at most 5.0%, and the coefficient of variation (β) of the manganese content is at most 10.0%.

[3] The composite oxide powder for a solid oxide fuel cell according to the above [1] or [2], which is represented by the following formula (I):

$$(\text{La}_{1-x}\text{A}_x)_{1-\alpha}\text{MnO}_{3+\delta} \quad (I)$$

wherein A is at least one element selected from the group consisting of Sr and Ca, $0 < x \leq 0.45$, $0 \leq \alpha \leq 0.1$ and $-0.05 \leq \delta \leq 0.2$.

[4] The composite oxide powder for a solid oxide fuel cell according to the above [3], wherein A is Sr, $0 < x \leq 0.40$, and $0 \leq \alpha \leq 0.06$.

[5] A method for producing the composite oxide powder for a solid oxide fuel cell as defined in any one of the above [1] to [4], which comprises forming raw material compounds each containing a metal element constituting the composite oxide powder for a solid oxide fuel cell into a solution or a slurry with citric acid and at least one member selected from the group consisting of malic acid, maleic acid and lactic acid, and drying and firing the solution or the slurry.

[6] The production method according to the above [5], wherein the solution or the slurry is spray dried by a spray dryer to form a dry powder, and the dry powder is fired at from 750° C. to 1,450° C.

[7] The production method according to the above [5] or [6], wherein citric acid and malic acid, or citric acid and maleic acid, are used.

[8] The production method according to any one of the above [5] to [7], wherein the amount of use of citric acid is from 0.5 to 3 times the sum of the numbers of moles of the respective metal elements in the raw material compounds, and the amount of use of at least one member selected from the group consisting of malic acid, maleic acid and lactic acid is form 0.5 to 3 times the sum of the numbers of moles of the respective metal elements in the raw material compounds.

[9] The production method according to any one of the above [5] to [8], wherein each of the raw material compounds is at least one member selected from the group consisting of a carbonate, an oxide, a hydroxide and an organic acid salt.

Advantageous Effects of Invention

According to the present invention, novel LSM fine particles having a more uniform composition as compared with one by a conventional solid phase method, coprecipitation method or slurry method, can be provided. Further, according to the present invention, a novel production method to obtain such novel LSM fine particles having a uniform composition can be provided.

DETAILED DESCRIPTION OF INVENTION

Figure 1:
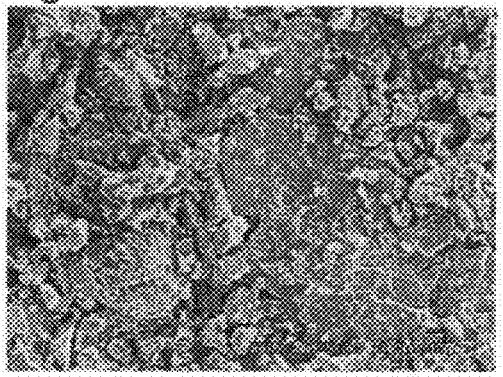
FIG. 1 is a SEM photograph (3,000-hold magnification) of LSM fine particles in Example 1.

The composite oxide powder for a solid oxide fuel cell of the present invention contains lanthanum, strontium and/or calcium, manganese and oxygen. The composite oxide powder for a solid oxide fuel cell of the present invention is preferably a composite oxide powder for a solid oxide fuel cell having a composition represented by the following formula (I) and having a perovskite structure:

$$(\text{La}_{1-x}\text{A}_x)_{1-\alpha}\text{MnO}_{3+\delta} \quad (I)$$

wherein A is at least one element selected from the group consisting of Sr and Ca, $0 < x \leq 0.45$, $0 \leq \alpha \leq 0.1$ and $-0.05 \leq \delta \leq 0.2$.

The value of δ may be determined e.g. by the average valency analysis of metal elements of the composite oxide by a wet oxidation/reduction titillation method or the valency analysis of the metal elements of the composite oxide by XANES as the case requires. It is preferred that A is Sr, $0 < x \leq 0.40$ and $0 \leq \alpha \leq 0.06$.

So long as the composite oxide of the present invention contains as the main component $(\text{La}_{1-x}\text{A}_x)_{1-\alpha}\text{MnO}_{3+\delta}$ having a perovskite structure, it may contain other impurity phases.

Part of Mn as the B site of the composite oxide having the composition represented by the formula (I) is preferably replaced with Mg, Cr, Co or Ni, whereby the heat cycle shrinkage of a fuel cell can be suppressed. It is preferred to replace from 0 to 10 mol % of Mn with Mg, Cr, Co or Ni.

In the formula, ranges of X and α of $0 < x \leq 0.45$ and $0 \leq \alpha \leq 0.1$ are preferred in order that the composite oxide maintains a perovskite structure.

Specifically, examples of the composite oxide LSM represented by the formula (I) include the following. However, the composite oxide is not limited thereto.

$La_{0.6}Sr_{0.4}MnO_{3+\delta}$
($x=0.4$, $\alpha=0.0$)
$La_{0.8}Ca_{0.2}MnO_{3+\delta}$
($x=0.2$, $\alpha=0.0$)
$La_{0.9}Sr_{0.06}Ca_{0.04}MnO_{3+\delta}$
($x=0.1$, $\alpha=0.0$)
$La_{0.54}Sr_{0.36}MnO_{3+\delta}$
($x=0.4$, $\alpha=0.1$)
$La_{0.76}Sr_{0.19}MnO_{3+\delta}$
($x=0.2$, $\alpha=0.05$)

In the present invention, the LSM powder (also called fine particles) of such a composite oxide is characterized by having a high uniformity of the composition of the respective components (La, Sr and/or Ca and Mn) in the particles as compared with conventional particles.

In the present invention, dispersion of the components in the composite oxide fine particles is evaluated by relative standard deviation (coefficient of variation: C.V.) and defined as follows.

In a scanning electron microscope (SEM) image of composite oxide fine particles, 12 lattice points divided into a lattice form each 8 μm on a side are determined as portions to be analyzed, the lanthanum content: $w_a$ (wt %) and the manganese content: $w_b$ (wt %) calculated from the peak area ratio of the Lα ray of lanthanum and the Kα ray of manganese in each of the 12 lattice points measured by an energy dispersive X-ray spectrometer (EDX) attached to the scanning electron microscope, satisfy the following relation.

That is, $[w_a]_1$, $[w_a]_2$, $[w_a]_3$, ... $[w_a]_{12}$ and $[w_b]_1$, $[w_b]_2$, $[w_b]_3$, ... $[w_b]_{12}$ satisfy $[w_a]_1+[w_b]_1=100$ (wt %), $[w_a]_2+[w_b]_2=100$ (wt %), ..., $[w_a]_{12}+[w_b]_{12}=100$ (wt %).

The present invention defines that when the above relation is satisfied, the coefficient of variation (α) of the lanthanum content in the 12 lattice points is at most 6.0% and that the coefficient of variation (β) of the manganese content in the 12 lattice points is at most 13.0%.

Here, in the present invention, wt % is defined to have the same meaning as mass %, and "the coefficient of variation of an element" means "the coefficient of variation of the average content of an element".

This point will be described in further detail with reference to $La_{0.8}Sr_{0.2}MnO_{3+\delta}$ (wherein $x=0.2$, and $\alpha=0.0$).

The above LSM may be represented by $ABO_{3+\delta}$ i.e. $(La_{0.8}Sr_{0.2})MnO_{3+\delta}$, and the formula (1) $w_a+w_b=100$ (wt %) defines the sum of the La content in the A site and the Mn content in the B site.

In the present invention, first, by the SEM-EDX measurement, the La and Mn contents are determined from the peak area ratio of the Lα ray of lanthanum and the Kα ray of manganese so that the sum of the La content $[w_a]_i$ and the Mn content $[w_b]_i$ in each of different 12 measurement points in the SEM image is 100 (wt %). The obtained $[w_a]_1$, $[w_a]_2$, $[w_a]_3$, ... $[w_a]_n$ and $[w_b]_1$, $[w_b]_2$, $[w_b]_3$, ... $[w_b]_n$ satisfy $[w_a]_1+[w_b]_1=100$ (wt %), $[w_a]_2+[w_b]_2=100$ (wt %), ... $[w_a]_n+[w_b]_n=100$ (wt %) (n=12). Then, by statistical processing of the La and Mn contents in the respective measurement points, the average contents of La and Mn ($[w_a]av$, $[w_b]av$) and the standard deviation are calculated.

Then, employing the above obtained average contents and standard deviation, (i) the standard deviation (dispersion) of the average content of La which is the element in the A site is divided by the average content to obtain the coefficient of variation.

Further, (ii) the dispersion of the average content of Mn which is the element in the B site is also divided by the average content to obtain the coefficient of variation.

For convenience of statistical processing, the EDX measurement is carried out with respect to 12 lattice points divided into a lattice form each 8 μm on a side in a scanning electron microscope (SEM) image, which are uniformly dispersed in the SEM image. For example, measurement is carried out with respect to different 12 points evenly dispersed in a lattice form in a SEM image.

The present invention is characterized in that when the composition of La and Mn is evaluated by the coefficient of variation (C.V.) as a measure of dispersion, the coefficient of variation is low. Specifically, in the above example, C.V. (α) of La≤6.0% and C.V. (β) of Mn≤13.0%, preferably C.V. (α) of La≤5.0% and C.V. (β) of Mn≤10.0%, and further preferably C.V. (α) of La≤3.0% and C.V. (β) of Mn≤6.0%.

As shown in the after-mentioned Comparative Example, a LSM powder prepared by a conventional citrate method has a greatly dispersed composition, and its coefficients of variation C.V. (α, β) are much higher beyond the ranges defined in the present invention.

Now, the method for producing the composite oxide powder for a solid oxide fuel cell having a composition represented by the following formula (I) according to the present invention will be described.

$$(La_{1-x}A_x)_{1-\alpha}MnO_{3+\delta} \qquad (I)$$

(Preparation of Raw Material Powders)

As powders as raw materials of the composite oxide powder for a solid oxide fuel cell having a composition represented by the formula (I) $(La_{1-x}A_x)_{1-\alpha}MnO_{3+\delta}$ according to the present invention, commonly employed powders may suitably be used, and for example, an oxide, a hydroxide, a carbonate, a nitrate, an organic acid salt and the like containing each of La, Sr and/or Ca and Mn may be mentioned.

Particularly in view of the environmental aspect and availability, preferred is a carbonate, a hydroxide or an oxide, and in view of high reactivity of the raw material, an organic acid salt such as a citrate is also preferred.

Further, as the raw material for one element, optional two or more compounds selected from a carbonate, an oxide, a hydroxide, a nitrate and the like may be selected as the element source.

The above raw material powders are weighed so that the respective elements La, Sr and/or Ca and Mn achieve the desired composition represented by the formula (I).

The respectively weighed raw material powders are preferably preliminarily pulverized to make particles fine, so that the after-mentioned reaction with citric acid and at least one member selected from the group consisting of malic acid, maleic acid and lactic acid quickly proceeds. Further, a part or all of the powders may be preliminarily uniformly mixed. Mixing may be carried out by dry mixing, but preferably carried out by a wet mixing method, whereby a homogeneous raw material powder can be obtained in a relatively short time, and particularly, pulverization may be carried out simultaneously with mixing.

An apparatus to carry out the wet mixing method is not particularly limited, and is preferably one which can carry out pulverization simultaneously. For example, a ball mill, a bead mill, an attrition mill or a colloid mill is preferred. Among them, one which employs a grinding medium such as zirconia balls, for example a ball mill or a bead mill, is more preferably used. For example, the above grinding medium may be added to the raw material powders, followed by pulverization and mixing using a ball mill for from 12 to 24 hours. Pulverization and mixing by a grinding medium e.g. by a ball mill is preferred, whereby a stronger shear force can be imparted, and a more homogeneous raw material mixed powder is obtained.
(Organic Acid Aqueous Solution)

Separately, an aqueous solution of an organic acid is preliminarily prepared. The organic acid is preferably a mixture of citric acid and at least one member selected from the group consisting of malic acid, maleic acid and lactic acid, which reacts with the compounds each containing a metal element to form a complex and can dissolve the complex. Particularly preferred is a combination of citric acid and malic acid or a combination of citric acid and maleic acid. As citric acid, anhydrous citric acid, citric acid monohydrate or a mixture of citric anhydride and citric acid monohydrate may be used. Further, D-malic acid and L-malic acid as optical isomers are present, and as malic acid used in the present invention, any of D-malic acid, L-malic acid and DL-malic acid mixture may be used.

The amount of use of the organic acid is preferably at least such an amount that the organic acid can form a complex with the metal element, and the complex can be completely dissolved. Specifically, the amount of use of citric acid is preferably from 0.5 to 3 times, more preferably from 0.5 to 2 times the sum of the numbers of moles of the metal elements in the raw material compounds each containing a metal element, and the amount of use of at least one member selected from the group consisting of malic acid, maleic acid and lactic acid is preferably from 0.5 to 3 times, more preferably from 0.5 to 2 times the sum of the numbers of moles of the metal elements in the raw material compounds each containing a metal element.

For example, when the amount of use of citric acid is from 0.5 to 3 times and the amount of use of malic acid is from 0.5 to 3 times the sum of the numbers of moles of the metal elements in the raw material compounds each containing a metal element, the solution or the slurry obtained by reacting the raw material compounds with citric acid and malic acid, is stable as the solution or the slurry and will not be solidified even after several days, or a dry composite powder will not expand at the time of the after-mentioned crude firing.

Further, when a mixture of citric acid with at least one member selected from the group consisting of malic acid, maleic acid and lactic acid is used, the firing temperature in the following main firing step can be lowered as compared with a case where only citric acid is used. That is, it is possible to produce a composite oxide having as the main phase LSM having a perovskite structure and having less impurity phase, by firing at a lower temperature.

The concentration of the aqueous solution of the organic acid is not particularly limited, and in view of operation workability and with a view to sufficiently increasing the reaction rate, it is from 10 to 70 wt %, preferably from 20 to 60 wt %, further preferably from 30 to 50 wt %.
(Reaction with Organic Acid)

The powders of compounds each containing a raw material metal element constituting the composite oxide prepared as mentioned above are reacted with the aqueous solution of the organic acid.

An apparatus to carry out this reaction is not particularly limited, and for example, a tank reactor equipped with a stirring means, a heating means, a raw material powder supplying means and an organic acid aqueous solution supplying means, capable of making supplied raw material powders float without precipitating and of allowing the raw material powders to react with the organic acid in a floating state, is preferred. As the stirring means, a conventional stirring machine, for example, any of a paddle agitator, a marine propeller stirrer and a turbine impeller mixer may suitably be used. In the case of a small-scale reaction, a flask-shaped container provided with a stirring machine may be used.

The method of contacting the powders of the metal element-containing compounds with the organic acid aqueous solution is not particularly limited so long as the reaction will efficiently be carried out and finally a uniform solution or slurry can be obtained, since the reaction is understood as a solid-liquid different phase reaction in view of chemical engineering. Usually, preferred is a method in which the organic acid aqueous solution is charged in a reactor, and the raw material powders are added thereto with stirring and reacted.

The raw material powders to be added may successively be added, or the raw material powders may preliminarily be mixed and the mixed powder is supplied all at once and reacted. Otherwise, such supply methods may be combined.

In a case where the raw material powders are successively added, first, a raw material compound containing one metal element e.g. a lanthanum oxide powder may be supplied to the organic acid aqueous solution, reacted and dissolved with heating, and then the other element compounds (e.g. strontium carbonate, manganese citrate and the like) are added and reacted all at once.

As the reaction temperature, the dissolution reaction is carried out preferably under heating to a certain extent, whereby the dissolution reaction will be promoted. The reaction temperature is usually from 30 to 100° C., preferably from 40 to 90° C., further preferably from 50 to 80° C. Further, the reaction time i.e. the time until which a uniform solution is formed may vary depending upon the reaction temperature, the organic acid concentration, the type of the organic acid and the raw material metal element-containing compounds, their particles sizes, etc., and is usually from 10 minutes to 48 hours, preferably from 30 minutes to 24 hours, further preferably from about 1 to about 10 hours.
(Drying)

In the present invention, the obtained solution or slurry is dried by a box dryer such as a shelf dryer or a spray dryer. Particularly preferred is spray drying using a spray dryer.

By drying, the solution or slurry in which the organic acid aqueous solution and the respective raw material metal elements are reacted is supplied to a drying apparatus such as an airflow dryer or a spray dryer and dried. The solution or slurry supplied to the drying apparatus is formed into fine droplets in the apparatus, which form a fluidized bed by heated air for drying, and the droplets are dried in an extremely short time while being transferred by the heated air, whereby the homogeneity of the respective metal elements La, Sr and/or Ca and Mn in the obtained dry powder is high.

As an atomizer when a spray dryer is used, one having e.g. a rotating disk, a two-fluid nozzle or a pressure nozzle may properly be employed, and the temperature of the heated air for drying is preferably from 150 to 300° C. at the inlet and from about 100 to about 150° C. at the outlet.

By such spray drying, the solution or slurry in which all the raw material metal elements are dissolved to form a uniform phase is formed into fine droplets, and from the droplets moisture is evaporated and removed instantaneously or in a very short time, whereby a dry powder (mixed powder) having a solid phase with a uniform composition in principle precipitated is obtained.
(Firing)

Then, the dried mixed powder is put in a firing container and fired in a firing furnace. Firing basically preferably comprises three steps differing in the firing temperature i.e. crude firing, temporary firing and main firing, but may comprise two steps of crude firing and main firing, may comprises two steps of temporary firing and main firing, or may comprise one step of only main firing of sequentially increasing the temperature. The material of the firing container is not particularly limited, and for example, mullite or cordierite may be mentioned.

Of the firing furnace, a heat source may be an electric or gas shuttle kiln or in some cases, a roller hearth kiln or a rotary kiln and is not particularly limited.

(Crude Firing)

In the crude firing step, an operation of increasing the temperature of the firing furnace to the desired firing temperature (300 to 500° C.) at a temperature-raising rate of from 20 to 800° C./hour is carried out. By the temperature-raising rate being at least 20° C./hour, the time until which the temperature reaches the desired firing temperature will be shortened, thus improving the productivity. Further, by the temperature-raising rate being at most 800° C./hour, chemical change of the reacting substances at each temperature will sufficiently proceed.

The firing temperature in crude firing is preferably from 300 to 500° C., more preferably from 350 to 450° C. By the firing temperature being at least 300° C., the carbon component is less likely to remain. Further, by the firing temperature being at most 500° C., the constituting elements are less likely to be segregated.

The firing time in crude firing is preferably from 4 to 24 hours, more preferably from 8 to 20 hours. By the firing time being at least 4 hours, the carbon component is less likely to remain. Further, if the firing time exceeds 24 hours, although there is no change in the product, the productivity tends to decrease, and accordingly it is preferably at most 24 hours. In crude firing, the temperature may be kept constant, for example at 400° C. for 8 hours, or may be gradually increased for example from 300° C. to 460° C. at a rate of 20° C./hour.

The atmosphere in the firing furnace when crude firing is carried out is an oxygen-containing atmosphere, and is preferably the air atmosphere (in the air) or an atmosphere having an oxygen concentration of at most 21 vol %. If the oxygen concentration exceeds 21 vol %, the carbon component in the raw material mixed powder will burn and the oxidation reaction partially proceeds and as a result, the constituting elements in the product may non-uniformly be present in some cases, and accordingly an atmosphere having an oxygen concentration of at most 21 vol % is preferred. The oxygen concentration is more preferably at most 15 vol %.

After crude firing is carried out for a predetermined time, the temperature is decreased to room temperature. The temperature-decreasing rate is preferably from 100 to 800° C./hour, more preferably from 100 to 400° C./hour. By the temperature-decreasing rate being at least 100° C., the productivity will improve. Further, by the temperature-decreasing rate being at most 800° C./hour, the firing container used is less likely to be broken by thermal shock. Here, after the crude firing step, the subsequent temporary firing step may be carried out without temperature decrease when the firing container is not changed and when crushing is not carried out.

Then, the oxide obtained in the crude firing step is crushed as the case requires. Crushing is usually carried out by dry crushing using a pulverizer such as a cutter mill, a jet mill or an atomizer. The volume average particle size after crushing is preferably from 1 to 50 μm, more preferably from 1 to 20 μm.

(Temporary Firing)

Then, the crude-fired powder which is crushed as the case requires is subjected to temporary firing at a temporary firing temperature (500 to 800° C.).

In the temporary firing step, the temperature of the firing furnace is increased to the desired temporary firing temperature at a temperature-raising rate of from 50 to 800° C./hour, preferably from 50 to 400° C./hour. By the temperature-raising rate being at least 50° C./hour, the time until which the temperature reaches the desired firing temperature will be shortened, thus improving the productivity. Further, by the temperature-raising rate being at most 800° C./hour, the chemical change of the reacting substances at each temperature will sufficiently proceed.

The temperature in temporary firing is preferably from 500 to 800° C., more preferably from 500 to 700° C. By the temperature being at least 500° C., the carbon component is less likely to remain. Further, by the temperature being at most 800° C., the fired powder is less likely to be excessively sintered.

The firing time is preferably from 4 to 24 hours, more preferably from 8 to 20 hours. By the firing time being at least 4 hours, the carbon component is less likely to remain. Further, by the firing time being at most 24 hours, the productivity will improve without any change in the product.

The atmosphere in the firing furnace when temporary firing is carried out is preferably the same oxygen-containing atmosphere as the atmosphere at the time of crude firing.

After temporary firing is carried out for a predetermined time, the temperature is decreased to room temperature. The temperature-decreasing rate is preferably from 100 to 800° C./hour, more preferably from 100 to 400° C./hour. By the temperature-decreasing rate being at least 100° C./hour, the productivity will not be lowered. Further, by the temperature-decreasing rate being at most 800° C./hour, the desired material will form.

Then, the oxide obtained by temporary firing is crushed as the case requires in the same manner as after crude firing. Crushing is usually carried out by dry crushing using a pulverizer such as a cutter mill, a jet mill or an atomizer. The volume average particle size after crushing is preferably from 1 to 50 μm, more preferably from 10 to 20 μm.

(Main Firing)

Further, the temporary-fired powder which is crushed as the case requires is subjected to main firing at the main firing temperature (750 to 1450° C.).

In the main firing step, the temperature in the firing furnace is increased to the desired firing temperature at a temperature-raising rate of from 50 to 800° C./hour, preferably from 50 to 400° C./hour. By the temperature-raising rate being at least 50° C./hour, the time until which the temperature reaches the desired firing temperature will be shortened, thus improving the productivity. Further, by the temperature-raising rate being at most 800° C./hour, such will not occur that the temperature reaches the desired firing temperature in such a condition that the chemical change of the reacting substances at each temperature does not sufficiently proceed and the reacting substances are in a non-uniform state, and accordingly by-products will not form in the fired product.

The temperature in main firing is preferably from 750 to 1,450° C. By the temperature being from 750 to 1,450° C., the desired crystal phase will form.

In the present invention, since the raw material compounds are reacted with citric acid and at least one member selected from the group consisting of maleic acid, malic acid and lactic acid, to form an amorphous composite organic acid salt, LSM having a single phase perovskite structure will form at such a low temperature of 750° C.

The firing time is preferably from 4 to 24 hours, more preferably from 5 to 20 hours. By the firing time being at least 4 hours, unreacted substances will not be mixed in the desired composite oxide, and even if an impurity phase is present in the formed product, its amount is very small, and thus physical properties of a sintered product preferred from such a composite oxide, such as electrical conductivity, will hardly be decreased. Further, by the firing time being at most 24 hours, there is no change in the product, and the productivity will not decrease.

The atmosphere in the firing furnace when main firing is carried out is preferably the same oxygen-containing atmosphere as crude firing or temporary firing.

After main firing is carried out for a predetermined time, the temperature is decreased to room temperature. The temperature-decreasing rate is preferably from 100 to 800° C./hour. By the temperature-decreasing rate being at least 100° C./hour, the productivity will not be lowered. Further, by the temperature-decreasing rate being at most 800° C./hour, the desired material will form.

Then, the oxide obtained by main firing is crushed in the same manner as after crude firing. Crushing is usually carried out by dry crushing using a pulverizer such as a cutter mill, a jet mill or an atomizer. The volume average particle size of the powder after crushing is preferably from 1 to 50 µm, more preferably from 1 to 20 µm. Then, as the case requires, the powder may be pulverized by wet pulverization to adjust the particle size.

The above crude firing, temporary firing and main firing may be continuously carried out without decreasing the temperature to room temperature after completion of each step or without carrying out crushing after firing. That is, temporary firing may be carried out continuously after crude firing, main firing may be carried out continuously after temporary firing, or three steps of crude firing, temporary firing and main firing may be carried out continuously.

(Molded Product, Sintered Product)

The powder (fine particles) obtained by main firing as mentioned above is a LSM powder in which the respective particles have a uniform composition, and a molded sintered product obtained by sintering a molded product of the powder may suitably be used as the air electrode for a solid oxide fuel cell. That is, it is understood that the molded sintered product takes over the uniform composition of the fine particles as it is, and accordingly a LSM sintered product having an extremely uniform composition in principle is formed.

As a means to form a molded product and a sintered product, known means are employed. For example, first, a LSM powder is mixed with a binder, the mixture is filled in a mold having a certain volume, and a pressure is applied from above to prepare a molded product of the powder.

The method to apply a pressure may be mechanical uniaxial press or cold isotactic press (CIP) or the like and is not particularly limited.

Then, the molded product is subjected to heat treatment to obtain a sintered product. The heat treatment temperature is preferably from 1,000 to 1,450° C. By the heat treatment temperature being at least 1,000° C., mechanical strength of the molded product will sufficiently be maintained, and by the heat treatment temperature being at most 1,450° C., it is unlikely that a part of the formed LSM is decomposed to form impurities, thus leading to non-uniformity of the composition. The heat treatment time is preferably from 2 to 24 hours.

EXAMPLES

Now, the present invention will be described with reference to comparison between Examples of the present invention (Examples 1 to 5) and a Comparative Example (Comparative Example 1). However, it is understood that such Examples are merely examples of the embodiment of the present invention, and the present invention is by no means restricted to such specific Examples.

In the following, "%" means "mass (or weight) %" unless otherwise specified.

Example 1

(1) (Preparation of Raw Material Powders and Organic Acid)

Raw material powders were weighed to form $(La_{0.8}Sr_{0.2})_{0.98}MnO_{3+\delta}$.

That is, as shown in Table 1, 565.18 g of lanthanum oxide ($La_2O_3$) as a La source, 127.95 g of strontium carbonate ($SrCO_3$) as a Sr source and 544.68 g of manganese carbonate ($MnCO_3$) as a Mn source (La:Sr:Mn of 0.784:0.196:1.00 by the atomic ratio) were weighted. The sum of the number of moles of La ions, the number of moles of Sr ions and the number of moles of Mn ions in the raw material metal compounds weighed as above was 8.72 moles.

Separately, in a 10 L (liter) separable flask, 917 g of citric acid monohydrate in an amount of 0.5 time respectively the numbers of moles of La ions, Sr ions and Mn ions, and 1,170 g of DL-malic acid in an amount respectively equal to the numbers of moles of La ions, Sr ions and Mn ions, were added to 3.8 L of pure water of 55° C. to prepare a citric acid/malic acid mixed aqueous solution.

(2) (Intermediate Product and Drying)

Lanthanum oxide, strontium carbonate and manganese carbonate were charged to the citric acid/malic acid mixed aqueous solution, and the mixture was heated to 75° C., followed by reaction at the temperature for 5 hours.

After completion of the reaction, the obtained slurry was dried by a spray dryer to obtain a dry powder of a composite organic acid salt as an intermediate product. As the spray dryer, BDP-10 Spray Bag Dryer (manufactured by OHKAWARA KAKOHKI CO., LTD.) was used, and drying was carried out under conditions of an inlet temperature of 200° C., an outlet temperature of 125° C. and an atomizer rotating speed of 15,000 rpm.

(3) (Crude Firing, Temporary Firing and Main Firing)

The obtained dry powder was filled in two 30 cm square mullite crucibles and fired in the air in an electric furnace at 400° C. for 10 hours to decompose the organic substances (crude firing). The temperature-raising rate from room temperature to 400° C. was 400° C./3 hours, and the temperature-decreasing rate from 400° C. to room temperature was 400° C./4 hours.

The obtained crude-fired powder was filled in one 30 cm square mullite crucible and fired in the air in an electric furnace at 600° C. for 10 hours to decompose remaining carbon (temporary firing). The temperature-raising rate from room temperature to 500° C. was 500° C./3 hours, the temperature-raising rate to 600° C. was 100° C./2 hours, and the temperature-decreasing rate from 600° C. to room temperature was 600° C./6 hours, and a temporary-fired powder was obtained.

The temporary-fired powder was filled in one 30 cm square mullite crucible and fired in the air in an electric furnace at 1,200° C. for 6 hours to obtain the desired LSM final powder $(La_{0.8}Sr_{0.2})_{0.98}MnO_{3+\delta}$ (main firing). The temperature-raising rate from room temperature to 700° C. was 700° C./4 hours, the temperature-raising rate to 1,200° C. was 200° C./3 hour, and the temperature-raising rate from 1,200° C. to room temperature was 1,200° C./12 hour. After main firing, the fired product was crushed to obtain a $(La_{0.8}Sr_{0.2})_{0.98}MnO_{3+\delta}$ powder.

(4) (Component Analysis)
(i) XRD Analysis

A small amount of the $(La_{0.8}Sr_{0.2})_{0.98}MnO_{3+\delta}$ final powder was collected and subjected to powder X-ray diffraction measurement using CuKα as an X-ray source to identify the crystal phase. For the X-ray diffraction measurement, RINT2200V manufactured by Rigaku Corporation was used.

As a result, the powder was confirmed to have a perovskite structure having single phase rhombohedral crystals (113).

(ii) SEM and EDX Analysis

Further, the powder was analyzed by a scanning electron microscope (SEM) and an energy dispersive X-ray spectrometer (EDX) attached thereto. The SEM used was FE-SEM S-4300 manufactured by Hitachi, Ltd., and the EDX detector was EDX EMAX6853-H manufactured by HORIBA, Ltd., resolution: 137 eV. Further, measurement was carried out under conditions of an accelerating voltage of 20 kV, an emission current of 20 μA, a magnification of 3,000-hold, WD of 15 mm, a process time of 4 and a count of at least 4,000,000.

Figure 2:
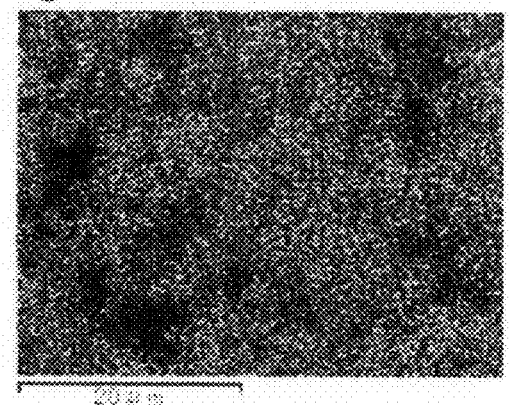
FIG. 2 is an EDX mapping of La to FIG. 1.
Figure 3:
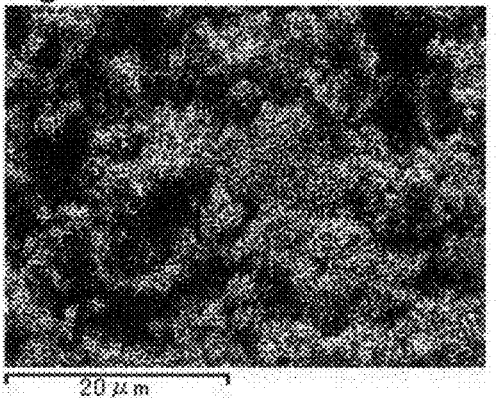
FIG. 3 is an EDX mapping of Sr to FIG. 1.
Figure 4:
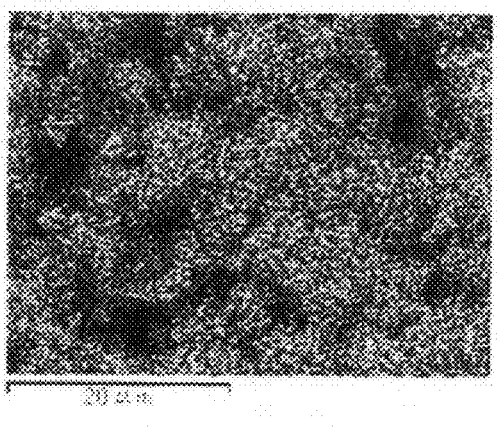
FIG. 4 is an EDX mapping of Mn to FIG. 1.

FIG. 1 is a SEM photograph (3,000-hold magnification) of the powder. FIGS. 2 to 4 are EDX mappings of La, Sr and Mn, respectively. From these mappings of La, Sr and Mn, segregation of the respective components was confirmed to be small as compared with the after-mentioned Comparative Example 1 in which the powder was prepared using only citric acid monohydrate. In the SEM image of the powder as shown in FIG. 1, with respect to 12 lattice points divided into a lattice form 8 μm on a side as portions to be analyzed, the peak areas of the Lα ray of lanthanum and the Kα ray of manganese in each lattice point were measured. From the peak areas, the lanthanum content and the manganese content were calculated so that the lanthanum content ($w_a$) and the manganese content ($w_b$) in each measurement point satisfied the relation of the formula (1), and the averages of the 12 measured values were obtained, whereupon the average contents of lanthanum and manganese were 68.1 wt % and 31.9 wt %, respectively. Further, the coefficient of variation (α) of lanthanum was 2.0%, and the coefficient of variation (β) of manganese was 4.3%.

$$w_a + w_b = 100 \text{ (wt \%)} \quad (1)$$

(iii) Particle Size Distribution Measurement

A small amount of $(La_{0.8}Sr_{0.2})_{0.98}MnO_{3+\delta}$ was dispersed in deionized water as follows to prepare a sample. Using as a dispersing agent an aqueous solution having a concentration of 0.24 wt % using sodium diphosphate decahydrate manufactured by Wako Pure Chemical Industries, Ltd., 10 ml of a dispersion was prepared from about 0.001 g of $(La_{0.8}Sr_{0.2})_{0.98}MnO_{3+\delta}$ and the dispersing agent, and the dispersion was irradiated with ultrasonic waves for 3 minutes to prepare a sample. Using the sample, the particle size distribution of $(La_{0.8}Sr_{0.2})_{0.98}MnO_{3+\delta}$ was measured by a laser diffraction/scattering type particle size distribution analyzer LA-920 manufactured by HORIBA Ltd. Immediately before the measurement, an ultrasonic treatment at an output of 30 W was carried out for 180 seconds. As a result, the volume average particle size $D_{50}$ was 15.1 μm.

Figure 5:
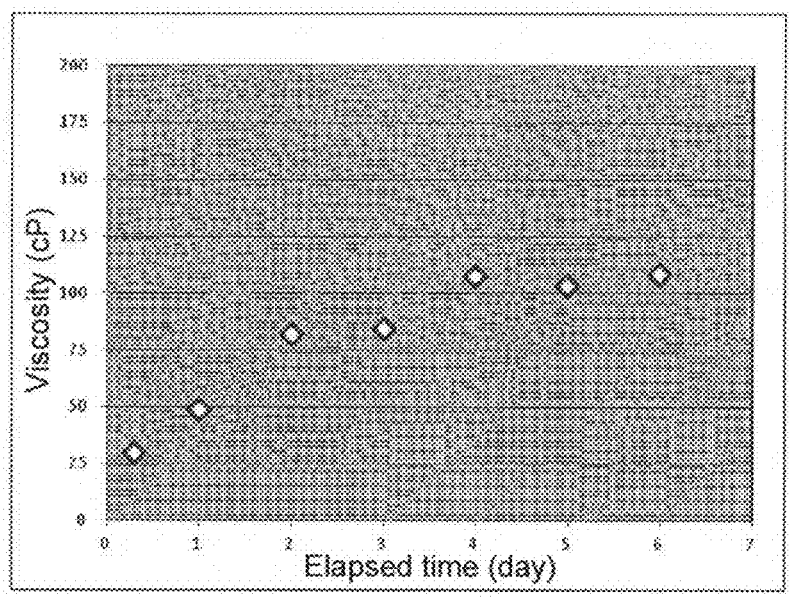
FIG. 5 is a drawing illustrating the time dependence of the viscosity of an organic acid (DL-malic acid and citric acid) solution of raw material compounds in Example 1.

(5) Stabilizing Test of Slurry Containing Raw Material Compounds and Organic Acid A mixed powder (La:Sr:Mn=0.784:0.196:1.00) containing 254.33 g of lanthanum oxide, 57.58 g of strontium carbonate, 245.11 g of manganese carbonate was prepared. Separately, 413 g of citric acid monohydrate and 526 g of DL-malic acid were weighed and dissolved in 1.35 L (liter) of pure water. The above mixed powder was dispersed in the aqueous solution containing citric acid monohydrate and DL-malic acid, and while the aqueous solution was maintained at 35° C., the viscosity was measured every 24 hours. The results are shown in FIG. 5. The slurry viscosity which was 26 cP immediately after the mixture of raw material compounds was charged increased to about 100 cP after a lapse of 4 days after charging of the raw material compounds, and even after a lapse of 6 days, it was stable at about 100 cP and kept low.

Example 2

(1) A final powder represented by $(La_{0.8}Sr_{0.2})_{0.98}MnO_{3+\delta}$ was obtained in the same manner as in Example 1 except that 656.84 g of lanthanum hydroxide ($La(OH)_3$) was used instead of 565.18 g of lanthanum oxide, and 2,026 g of maleic acid in an amount of 1.73 times respectively the numbers of moles of La ions, Sr ions and Mn ions was added instead of 1,170 g of DL-malic acid, and the main firing temperature was 1,000° C. (see Table 1).

The temperature program of main firing was such that the temperature-raising rate from room temperature to 700° C. was 700° C./4 hours, the temperature-raising rate to 1,000° C. was 100° C./1 hour, and the temperature-decreasing rate from 1,000° C. to room temperature was 100° C./1 hour. After main firing, the fired powder was crushed to obtain a $(La_{0.8}Sr_{0.2})_{0.98}MnO_{3+\delta}$ powder.

(2) (Component Analysis)

(i) XRD Analysis

A small amount of the $(La_{0.8}Sr_{0.2})_{0.98}MnO_{3+\delta}$ final powder was collected and subjected to powder X-ray diffraction measurement in the same manner as in Example 1. As a result, the powder was confirmed to have a perovskite structure having single phase rhombohedral crystals (113).

(ii) SEM and EDX Analyses

Further, the powder was analyzed by a scanning electron microscope (SEM) and an energy dispersive X-ray spectrometer (EDX) attached thereto in the same manner as in Example 1.

From the surface state shown in the SEM photograph of the powder and the mappings of La and Sr by EDX, it was confirmed that segregation was small as compared with the after-mentioned Comparative Example 1 in which a powder was prepared only by citric acid monohydrate, like Example 1.

The lanthanum content ($w_a$ (wt %)) and the manganese content ($w_b$ (wt %)) calculated from the peak area ratio of the Lα ray of lanthanum and the Kα ray of manganese as obtained by EDX analysis in the same manner as in Example 1 were determined to satisfy the relation of the formula (1) and the average lanthanum content and the average manganese content were calculated, whereupon they were 68.0 wt % and 32.0 wt %, respectively. The coefficient of variation C.V. (α) of lanthanum calculated was 2.8%, and the coefficient of variation C.V. (β) of manganese was 6.1%:

$$w_a + w_b = 100 \text{ (wt \%)} \quad (1)$$

(iii) Particle Size Distribution Measurement

Particle size distribution measurement was carried out in the same manner as in Example 1. As a result, the volume average particle size $D_{50}$ of $(La_{0.8}Sr_{0.2})_{0.98}MnO_{3+\delta}$ was 15.7 μm.

Comparative Example 1

(1) (Intermediate Product Obtained by Adding Raw Material Powders and Organic Acid)

Raw materials were weighed to form $(La_{0.8}Sr_{0.2})_{0.98}MnO_{3+\delta}$ in the same manner as in Example 1 (see Table 1).

Separately, 2 L (liter) of pure water was added in a 10 L separable flask, lanthanum oxide was added, and the liquid temperature was maintained at 50° C., followed by a hydration reaction $(La_2O_3+3H_2O \rightarrow 2La(OH)_3)$ for 2 hours. To the reaction mixture, strontium carbonate and manganese carbonate were added and dispersed for one hour. Further, 1,773 g of citric acid monohydrate was added, followed by reaction for 2 hours to obtain a pale pink slurry.

The amount of citric acid used was equivalent respectively to the numbers of moles of La ions and Mn ions and is ⅔ time the number of moles of Sr ions.

(2) (Drying of Intermediate Product)

After completion of the reaction, the obtained slurry was dried by a spray dryer to obtain a dry powder of a composite organic acid salt as an intermediate product. As the spray dryer, BDP-10 Spray Bag Dryer (manufactured by OHKAWARA KAKOHKI CO., LTD.) was used, and drying was carried out under conditions of an inlet temperature of 200° C., an outlet temperature of 125° C. and an atomizer rotating speed of 15,000 rpm.

(3) (Crude Firing, Temporary Firing and Main Firing)

The obtained dry powder was filled in two 30 cm square mullite crucibles, and subjected to crude firing in the air in an electric furnace in the same manner as in Example 1 and further to temporary firing and main firing. After main firing, the fired powder was crushed to obtain a $(La_{0.8}Sr_{0.2})_{0.98}MnO_{3+\delta}$ powder.

(4) (Component Analysis)

(i) XRD Analysis

A small amount of the $(La_{0.8}Sr_{0.2})_{0.98}MnO_{3+\delta}$ final powder was collected and subjected to powder X-ray diffraction measurement in the same manner as in Example 1. As a result, the powder was confirmed to comprise a main phase corresponding to a perovskite structure having rhombohedral crystals (113) and a very small amount of $Mn_3O_4$ corresponding to an impurity phase.

(ii) SEM and EDX Analyses

Further, the powder was analyzed by a scanning electron microscope (SEM) and an energy dispersive X-ray spectrometer (EDX) attached thereto in the same manner as in Example 1.

Figure 6:
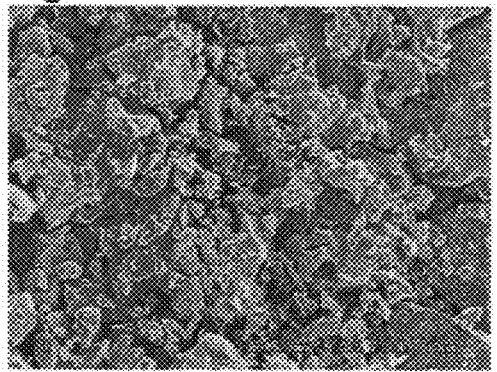
FIG. 6 is a SEM photograph (3,000-hold magnification) of LSM fine particles in Comparative Example 1.
Figure 7:
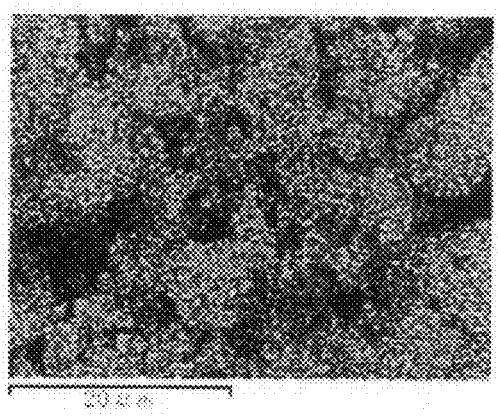
FIG. 7 is an EDX mapping of La to FIG. 6.
Figure 8:
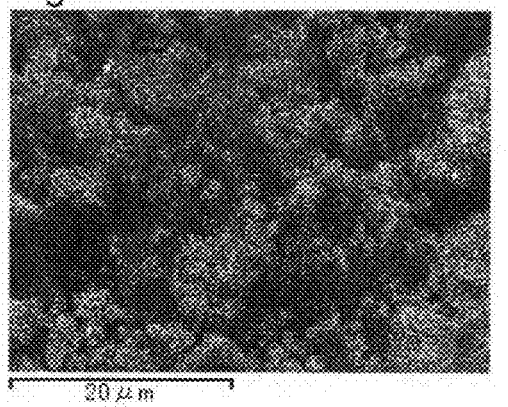
FIG. 8 is an EDX mapping of Sr to FIG. 6.
Figure 9:
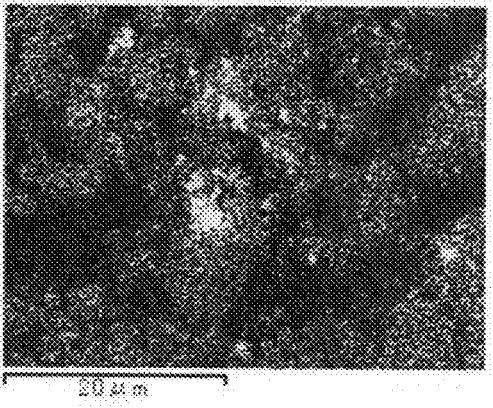
FIG. 9 is an EDX mapping of Mn to FIG. 6.

FIG. 6 is a SEM photograph (3,000-holds magnification) of the powder. FIGS. 7 to 9 are EDX mappings of La, Sr and Mn, respectively. In these drawings, significant segregation of La, Sr and Mn was confirmed.

The lanthanum content ($w_a$ (wt %)) and the manganese content ($w_b$ (wt %)) calculated from the peak area ratio of the Lα ray of lanthanum and the Kα ray of manganese as obtained by EDX analysis in the same manner as in Example 1 were determined to satisfy the relation of the formula (1), and the average lanthanum content and the average manganese content were calculated, whereupon they were 66.7 wt % and 33.3 wt %, respectively. The coefficient of variation C.V. (α) of lanthanum calculated was 10.4%, and the coefficient of variation C.V. (β) of manganese was 20.8%:

$$w_a+w_b=100 \text{ (wt \%)} \tag{1}$$

(iii) Particle Size Distribution Measurement

Particle size distribution measurement was carried out in the same manner as in Example 1. As a result, the volume average particle size $D_{50}$ of $(La_{0.8}Sr_{0.2})_{0.98}MnO_{3+\delta}$ was 15.3 µm.

(5) Stabilizing Test of Slurry Containing Raw Material Compounds and Organic Acid In the same manner as in Example 1, a mixed powder (La:Sr:Mn=0.784:0.196:1.00) containing lanthanum oxide, strontium carbonate and manganese carbonate was prepared. Separately, 798 g of citric acid monohydrate was weighed and dissolved in 1.35 L (liter) of pure water. The above mixed powder was dispersed in the aqueous solution containing citric acid monohydrate, and while the aqueous solution was kept at 35° C., the viscosity was measured. The slurry which had a slurry viscosity of 25 Cp immediately after the mixture of raw material compounds was charged was solidified after a lapse of 24 hours after charging of the raw material compounds.

Example 3

(1) A final powder represented by $(La_{0.8}Sr_{0.2})_{0.95}MnO_{3+\delta}$ was obtained in the same manner as in Example 1 except that 559.04 g of lanthanum oxide, 126.56 g of strontium carbonate and 555.78 g of manganese carbonate were used, and 921 g of citric acid monohydrate in an amount of 0.5 time respectively the numbers of moles of La ions, Sr ions and Mn ions and 1,176 g of DL-malic acid in an amount equivalent respectively to the numbers of moles of La ions, Sr ions and Mn ions were used (see Table 1).

(2) (Component Analysis)

(i) XRD Analysis

A small amount of the $(La_{0.8}Sr_{0.2})_{0.95}MnO_{3+\delta}$ a final powder was collected and subjected to powder X-ray diffraction measurement in the same manner as in Example 1. As a result, the powder was confirmed to comprise the main phase corresponding to a perovskite structure having rhombohedral crystals (113) and a very small amount of $Mn_3O_4$ corresponding to an impurity phase.

(ii) SEM and EDX Analyses

Further, the powder was analyzed by a scanning electron microscope (SEM) and an energy dispersive X-ray spectrometer (EDX) attached thereto in the same manner as in Example 1.

The surface state shown in the SEM photograph of the powder and the mappings of La and Sr by EDX were the same as in Example 1, but slight segregation was confirmed with respect to Mn. However, they were confirmed to be substantially uniformly distributed on the whole.

The lanthanum content ($w_a$ (wt %)) and the manganese content ($w_b$ (wt %)) calculated from the peak area ratio of the Lα ray of lanthanum and the Kα ray of manganese as obtained by EDX analysis in the same manner as in Example 1 were determined to satisfy the relation of the formula (1), and the average lanthanum content and the average manganese content were calculated, whereupon they were 67.8 wt % and 32.2 wt %, respectively. The coefficient of variation C.V. (α) of lanthanum calculated was 4.3%, and the coefficient of variation C.V. (β) of manganese was 9.0%:

$$w_a+w_b=100 \text{ (wt \%)} \tag{1}$$

(iii) Particle Size Distribution Measurement

Particle size distribution measurement was carried out in the same manner as in Example 1. As a result, the volume average particle size $D_{50}$ of $(La_{0.8}Sr_{0.2})_{0.95}MnO_{3+\delta}$ was 15.7 µm.

Example 4

(1) (Preparation of Raw Material Powders and Organic Acid)

Raw materials were weighed to form $La_{0.6}Ca_{0.4}MnO_{3+\delta}$. That is, as shown in Table 1, 493.04 g of lanthanum oxide ($La_2O_3$) as the La source, 200.83 g of calcium carbonate ($CaCO_3$) as a Ca source and 620.88 g of manganese carbonate ($MnCO_3$) as a Mn source (La:Ca:Mn of 0.6:0.4:1.0 by the atomic ratio) were weighed. The sum of the number of moles of La, the number of moles of Ca and the number of moles of Mn in the above weighed raw material metal compounds was 10.04 mol.

Thereafter, the same operation as in Example 1 was carried out except that 3,166 g of citric acid in an amount of 1.5 times respectively the numbers of moles of La ions, Sr ions and Mn ions and 2,694 g DL-malic acid in an amount of 2 times respectively the numbers of moles of La ions, Sr ions and Mn ions were used instead of 917 g of citric acid monohydrate and 1,170 g of malic acid, and main firing was carried out at 1,100° C. for 6 hours, to obtain a final powder ($La_{0.6}Ca_{0.4}MnO_{3+\delta}$).

The temperature-raising rate from room temperature to 700° C. was 700° C./4 hours, the temperature-raising rate to 1,100° C. was 200° C./3 hour, and the temperature-decreasing rate from 1,100° C. to room temperature was 1,100° C./11 hours.

(2) (Component Analysis)

(i) XRD Analysis

A small amount of the $La_{0.6}Ca_{0.4}MnO_{3+\delta}$ final powder was collected and subjected to powder X-ray diffraction measurement using CuKα as an X-ray source to identify the crystal phase. For X-ray diffraction measurement, the same RINT2200V manufactured by Rigaku Corporation as in Example 1 was used. As a result, the powder was confirmed to have a single phase perovskite structure.

(ii) SEM and EDX Analyses

Further, the powder was analyzed by a scanning electron microscope (SEM) and an energy dispersive X-ray spectrometer (EDX) attached thereto.

The surface state shown in the SEM photograph of the powder and the mappings of La, Ca and Mn by EDX were the same as in Example 1, and the degree of segregation was low as compared with Comparative Example 1.

The lanthanum content ($w_a$ (wt %)) and the manganese content ($w_b$ (wt %)) calculated from the peak area ratio of the Lα ray of lanthanum and the Kα ray of manganese as obtained by EDX analysis in the same manner as in Example 1 were determined to satisfy the relation of the formula (1), and the average lanthanum content and the average manganese content were calculated, whereupon they were 61.8 wt % and 38.2 wt %, respectively. The coefficient of variation C.V. (α) of lanthanum calculated was 3.7%, and the coefficient of variation C.V. (β) of manganese was 6.0%:

$$w_a + w_b = 100 \text{ (wt \%)} \tag{1}$$

(iii) Particle Size Distribution Measurement

Particle size distribution measurement was carried out in the same manner as in Example 1. As a result, the volume average particle size $D_{50}$ of ($La_{0.6}Ca_{0.4}MnO_{3+\delta}$ was 15.9 μm.

Example 5

(1) (Preparation of Raw Material Powders and Organic Acid)

Raw materials were weighed to form $La_{0.8}Sr_{0.2}MnO_{3+\delta}$.

That is, as shown in Table 1, 1,065.92 g of lanthanum carbonate ($La_2(CO_3)_3 \cdot 8H_2O$) as a La source, 1,28.85 g of strontium carbonate ($SrCO_3$) as a Sr source and 1,169.82 g of manganese acetate ($Mn(CH_3COO)_2 \cdot 4H_2O$) as a Mn source (La:Sr:Mn of 0.8:0.2:1.0 by the atomic ratio) were weighed, and thereafter, the same operation as in Example 1 was carried out except that the amounts of use of citric acid monohydrate and DL-malic acid were 1,827 g and 1,166 g, respectively, to obtain a slurry comprising citric acid monohydrate, DL-malic acid and raw material metal compounds.

The amounts of use of citric acid monohydrate and DL-malic acid were respectively equivalent to the sum of La ions, Sr ions and Mn ions in the raw material metal compounds.

(2) (Intermediate Product and Drying)

After completion of the reaction, the obtained solution was dried by a spray dryer to obtain a dry powder of a composite organic acid salt as an intermediate product. As the spray dryer, the same BDP-10 Spray Bag Dryer (manufactured by OHKAWARA KAKOHKI CO., LTD.) as in Example 1 was used, and drying was carried out under the same conditions as in Example 1.

(3) (Crude Firing, Temporary Firing and Main Firing)

The obtained dry powder was subjected to crude firing and temporary firing under the same conditions as in Example 1.

The temporary-dried powder was filled in one 30 cm square mullite crucible and fired in the air in an electric furnace at 800° C. for 6 hours to obtain a desired LSM final powder ($La_{0.8}Sr_{0.2}MnO_{3+\delta}$) (main firing).

The temperature-raising rate from room temperature to 800° C. was 800° C./4 hours, and the temperature-decreasing rate from 800° C. to room temperature was 100° C./1 hour.

(4) (Component Analysis)

(i) XRD Analysis

A small amount of the $La_{0.8}Sr_{0.2}MnO_{3+\delta}$ final powder was collected and subjected to powder X-ray diffraction measurement using CuKα as an X-ray source to identify the crystal phase. For X-ray diffraction measurement, the same RINT2200V manufactured by Rigaku Corporation as in Example 1 was used. As a result, the powder was confirmed to have a perovskite structure having single phase rhombohedral crystals (113).

(ii) SEM and EDX Analyses

Further, the powder was analyzed by the scanning electron microscope (SEM) and the energy dispersive X-ray spectrometer (EDX) attached thereto used in Example 1.

The surface state of the powder by the SEM photograph and mappings of La, Sr and Mn by EDX were the same as in Example 1, and the degree of segregation was low as compared with Comparative Example 1.

The lanthanum content ($w_a$ (wt %)) and the manganese content ($w_b$ (wt %)) calculated from the peak area ratio of the Lα ray of lanthanum and the Kα ray of manganese by EDX measured in the same manner as in Example 1 were determined to satisfy the relation of the formula (1), and the average lanthanum content and the average manganese content were calculated, whereupon they were 68.9 wt % and 31.1 wt %, respectively. The coefficient of variation C.V. (α) of lanthanum calculated was 1.8%, and the coefficient of variation C.V. (β) of manganese was 4.0%:

$$w_a + w_b = 100 \text{ (wt \%)} \tag{1}$$

(iii) Particle Size Distribution Measurement

Particle size distribution measurement was carried out in the same manner as in Example 1. As a result, the volume average particle size $D_{50}$ of $La_{0.8}Sr_{0.2}MnO_{3+\delta}$ was 16.1 μm.

TABLE 1

| | Composition | Raw material compound | Metal content (wt %) | Amount used (g) | Organic acid | Amount used (g) | Organic acid | Amount used (g) | Main firing temperature (°C.) | Coefficient of variation (%) |
|---|---|---|---|---|---|---|---|---|---|---|
| Ex. 1 | $(La_{0.8}Sr_{0.2})_{0.98}MnO_{3+\delta}$ | Lanthanum oxide | 84.90 | 565.18 | Citric acid | 917 | Malic acid | 1170 | 1200 | La: 2.0 |
| | | Strontium carbonate | 59.14 | 127.95 | | | | | | Mn: 4.3 |
| | | Manganese carbonate | 44.44 | 544.68 | | | | | | |
| Ex. 2 | $(La_{0.8}Sr_{0.2})_{0.98}MnO_{3+\delta}$ | Lanthanum hydroxide | 73.05 | 656.84 | Citric acid | 917 | Maleic acid | 2026 | 1000 | La: 2.8 |
| | | Strontium carbonate | 59.14 | 127.95 | | | | | | Mn: 6.1 |
| | | Manganese carbonate | 44.44 | 544.68 | | | | | | |
| Ex. 3 | $(La_{0.8}Sr_{0.2})_{0.95}MnO_{3+\delta}$ | Lanthanum oxide | 84.90 | 559.04 | Citric acid | 921 | Malic acid | 1176 | 1200 | La: 4.3 |
| | | Strontium carbonate | 59.14 | 126.56 | | | | | | Mn: 9.0 |
| | | Manganese carbonate | 44.44 | 555.78 | | | | | | |
| Ex. 4 | $La_{0.6}Ca_{0.4}MnO_{3+\delta}$ | Lanthanum oxide | 84.90 | 493.04 | Citric acid | 3166 | Malic acid | 2694 | 1100 | La: 3.7 |
| | | Calcium carbonate | 40.09 | 200.83 | | | | | | Mn: 6.0 |
| | | Manganese carbonate | 44.44 | 620.88 | | | | | | |
| Ex. 5 | $La_{0.8}Sr_{0.2}MnO_{3+\delta}$ | Lanthanum oxide | 45.33 | 1065.92 | Citric acid | 1827 | Malic acid | 1166 | 800 | La: 1.8 |
| | | Strontium carbonate | 59.14 | 128.85 | | | | | | Mn: 4.0 |
| | | Manganese acetate | 20.42 | 1169.82 | | | | | | |
| Comp. Ex. 1 | $(La_{0.8}Sr_{0.2})_{0.98}MnO_{3+\delta}$ | Lanthanum oxide | 84.90 | 565.18 | Citric acid | 1773 | — | — | 1200 | La: 10.4 |
| | | Strontium carbonate | 59.14 | 127.95 | | | | | | Mn: 20.8 |
| | | Manganese carbonate | 44.44 | 544.68 | | | | | | |

INDUSTRIAL APPLICABILITY

A LSM sintered product having a uniform composition obtained from novel LSM fine particles having a uniform composition of the present invention is useful as an air electrode for a solid oxide fuel cell, an element utilizing giant magnetic resistance, etc. and the present invention is highly industrially useful.

What is claimed is:

1. A composite oxide powder comprising lanthanum, strontium and/or calcium, manganese and oxygen, wherein when the lanthanum content ($w_a$ (wt %)) and the manganese content ($w_b$ (wt%)) calculated from the peak area ratio of the L$\alpha$ ray of lanthanum and the K$\alpha$ ray of manganese in each of 12 lattice points divided into a lattice form each 8 μm on a side, as portions to be analyzed, in a scanning electron microscope (SEM) image of the composite oxide powder measured by an energy dispersive X-ray spectrometer (EDX) attached to the scanning electron microscope, satisfy the relation of formula (1), the coefficient of variation ($\alpha$) of the lanthanum content in the 12 lattice points is at most 6.0%, and the coefficient of variation ($\beta$) of the manganese content in the 12 lattice points is at most 13.0%:

$$w_a + w_b = 100 \text{ (wt \%)} \qquad \text{formula (1)}.$$

2. The composite oxide powder according to claim 1, wherein the coefficient of variation ($\alpha$) of the lanthanum content is at most 5.0%, and the coefficient of variation ($\beta$) of the manganese content is at most 10.0%.

3. The composite oxide powder according to claim 1, which is represented by the following formula (I):

$$(La_{1-x}A_x)_{1-a}MnO_{3+\delta} \qquad (I)$$

wherein A is at least one element selected from the group consisting of Sr and Ca, and $0 < x \leq 0.45$, $0 \leq a \leq 0.1$ and $-0.05 \leq \delta \leq 0.2$.

4. The composite oxide powder according to claim 3, wherein A is Sr, and $0 < x \leq 0.40$ and $0 \leq a \leq 0.06$.

5. A method for producing the composite oxide powder of claim 1, said method comprising
forming raw material compounds each containing a metal element constituting the composite oxide powder into a solution or a slurry with citric acid and at least one member selected from the group consisting of malic acid, maleic acid and lactic acid, and
drying said slurry or solution, and
firing the dried solution or slurry to produce the composite oxide power.

6. The method according to claim 5, wherein the solution or the slurry is spray dried by a spray dryer to form a dry powder, and the dry powder is fired at from 750° C. to 1,450° C.

7. The method according to claim 5, wherein either citric acid and malic acid, or citric acid and maleic acid, are used to prepare the solution or slurry.

8. The method according to claim 5, wherein the amount of use of citric acid is from 0.5 to 3 times the sum of the numbers of moles of the respective metal elements in the raw material compounds, and the quantity of respective metal elements in the raw material compounds, and the quantity of at least one member selected from the group consisting of malic acid, maleic acid and lactic acid is from 0.5 to 3 times the sum of the numbers of moles of the respective metal elements in the raw material compounds.

9. The method according to claim 5, wherein each of the raw material compounds is at least one member selected from the group consisting of a carbonate, an oxide, a hydroxide and an organic acid salt.

10. The method according to claim 5 wherein the firing of the dried slurry or solution is carried out in an oxygen-containing atmosphere comprising an oxygen concentration of at most 15 vol %.

11. The method according to claim 5 further comprising crushing the composite oxide powder to an average particle size of from 1 to 20 μm.

* * * * *